Dec. 21, 1926.

J. E. MALIVERT

VISUAL INDICATOR

Filed Jan. 26, 1926

1,611,659

INVENTOR
JULES E. MALIVERT
BY
ATTORNEYS

Patented Dec. 21, 1926.

1,611,659

UNITED STATES PATENT OFFICE.

JULES EUGÈNE MALIVERT, OF PARIS, FRANCE, ASSIGNOR TO SOCIÉTÉ ANONYME DES APPAREILS J. E. MALIVERT, OF PARIS, FRANCE.

VISUAL INDICATOR.

Application filed January 26, 1926, Serial No. 83,868, and in France February 16, 1925.

This invention relates to an apparatus comprising a visual indicator operated by a piston which is subjected, through an interposed diaphragm, to the pressure of a liquid or of a gas circulating in a system of pipes or conduits, and intended to indicate the state of the circulation of the said fluid, for example, cooling water, lubricant, petrol or other liquid in an automobile or other motor.

The visual indicator according to this invention, which is constructed in a manner effecting an economy of manufacture and giving ready access to the regulating members without it being necessary to dismount the apparatus, is essentially characterized by the following features:

1. The spindle of the visual indicator is mounted perpendicularly to the axis of the piston actuated by the diaphragm.

2. The piston acts through an intermediate plunger on an arm, the position of which is preferably adjustable, carried by the spindle of the visual indicator so as to permit;

(*a*) Movement of this arm towards and away from the spindle in order to vary the effective leverage and, consequently, the angular displacement of the visual indicator for any given movement of the piston.

(*b*) By raising or lowering the said arm to vary the point at which the movement commences.

3. The retractive force acting on the plunger can readily be regulated, after the raising of the lid, by the rotation in a suitable direction of a screw threaded sleeve access to which is had by thus raising the lid.

In order to fix the ideas, there is hereinafter described, with reference to the accompanying drawing and by way of example only, a constructional form of the visual indicator in accordance with this invention.

Figure 2:
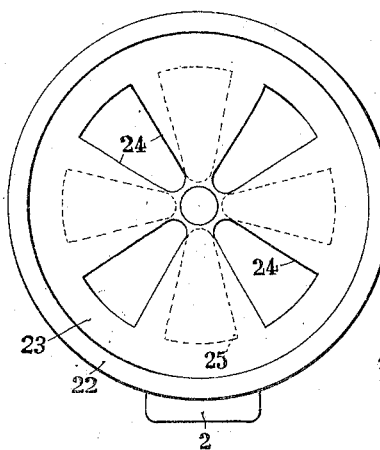
Fig. 2 is a front view.

As shown in the accompanying drawing, the visual indicator comprises a casing 1 which can be mounted by means of a connector 2 on a pipe or tube in which a liquid or gas is circulating under pressure. The connector 2 is attached to and held in the casing 1 by a ring 3 screwing into the said casing and pressing against a circular disc or base 4 integral with the said connector. This base 4, which is lodged in a circular recess 5 in the casing, has on its periphery one or more projections 6 which engage in corresponding grooves in the casing and oppose the rotation of the connector in the said casing. This base 4 is clamped upon and secures the edges of a flexible diaphragm 7 which is subjected to the action of the pressure of the liquid or gas circulating in the pipe or tube on which the apparatus is mounted, by means of an orifice 8 perforating the base 4 of the connector.

Figure 1:
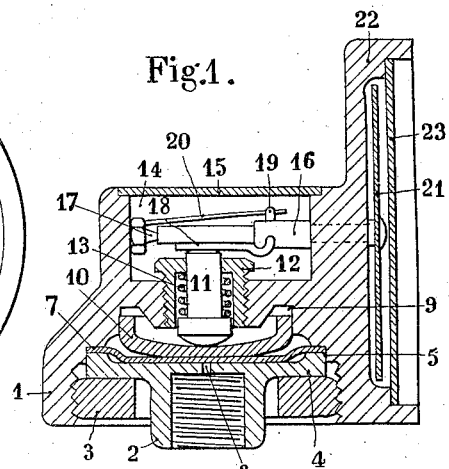
Figure 1 is a vertical, longitudinal section of the apparatus taken on the line A—A, Fig. 3.
Figure 3:
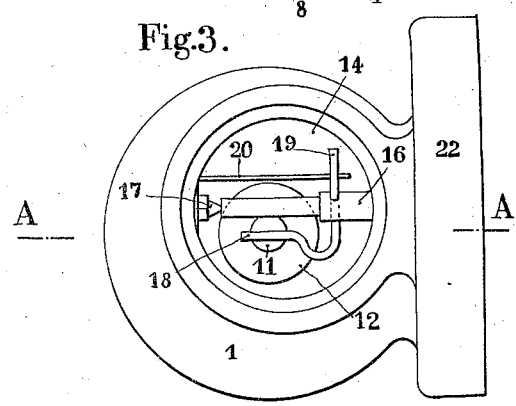
Fig. 3 is a plan with the lid removed.
Figure 4:
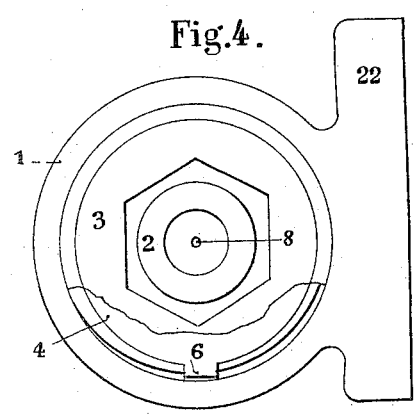
Fig. 4 is an underside view of the apparatus with parts removed.

The casing 1 comprises, moreover, a cylindrical recess 9 in the interior of which is mounted with slight friction a piston 10 which is held in contact with the flexible diaphragm 7 by a plunger 11 movable longitudinally in a sleeve 12 screwed into the casing 1 and enclosing a spring 13 thrusting the plunger 11 against the piston 10 as clearly shown in Fig. 1.

The head of the sleeve 12 projects into a chamber 14 which is formed in the casing 1, is closed by a removable lid 15, and encloses a spindle 16 the longitudinal axis of which is arranged transversely to that of the piston 10.

This spindle 16, which is rotatably supported in a wall of the casing 1 and abuts against a bearing centre 17 secured in the chamber 14, carries a bent rod, the position of which can be adjusted, having one of its arms 18 lying in a direction parallel to the axis of the spindle 16, extending above the plunger 11; the other arm 19 extending perpendicular to the spindle 16 through which it passes, being subjected to the action of a rod 20 acting as a spring and operating to urge the arm 18 towards the plunger 11.

The spindle 16 on the other hand carries keyed on its free end the visual indicator which, formed by a disc 21 carrying coloured sectors 25, is lodged in a circular chamber 22 closed by a plate 23 having apertures 24 therein, and is urged by the spring 20 into a position of rest such that the coloured sectors 25 are presented behind the full parts of the plate 23.

The operation of the apparatus hereinabove described is as follows:

The circulating liquid or the gas, admitted by the orifice 8 below the flexible diaphragm 7, presses against the latter, and, consequently, the piston 10 and the plunger 11, thereby compressing the opposing spring 13. In its rising movement this plunger 11 carries with it the bent rod 18, 19 urged towards the plunger by the spring 20, and consequently produces an angular rotation of the spindle 16 and of the visual indicator 21 which thus causes the appearance at the apertures 24 in the plate 23, of the coloured sectors 25 carried thereby which indicate that the circulation is in normal operation.

If the circulation stops, the piston is moved by the spring 13 and the plunger 11 into the position shown in Fig. 1 whilst the visual indicator 21 urged by the rod 20 acting as a spring, is returned to its position of rest in which the coloured sectors 25 are hidden by the full parts of the plates 23 as has been hereinabove explained.

It will be obvious from the preceding description that the apparatus according to the invention is of very simple construction and therefore it can be manufactured very economically.

The raising of the lid 15 closing the chamber 14 allows access to be had readily to the members enclosed in this chamber and permits:—

1.—Adjustment of the arm 18 of the bent rod 18, 19, towards and away from the spindle 16 in order to vary the effective leverage and, consequently, to vary the angular displacement of the visual indicator 21 for a predetermined movement of the piston 10 actuated by the diaphragm 7 and acting on the said arm through the interposed spring plunger.

2.—Variation of the point at which movement by the plunger commences to affect the arm 18, by raising or lowering the said arm.

3.—Adjustment of the tension of the spring 13, and consequently of the force with which it acts on the plunger 11, by rotation of the screw threaded sleeve 12 in the required direction.

The arrangements hereinabove described, as is well understood, are only given by way of example, the forms, materials and dimensions of the constituent parts, as well as the details of construction, can be modified without changing or departing from the nature of the invention.

The principle of the invention can be applied to pressure indicating apparatus for liquids or gases, comprising a movable visual indicator with symmetrically opposite coloured sectors, intended to give by the appearance of these coloured sectors opposite to the apertures in the fixed plates, the following indications:

Deficiency of pressure;
Normal pressure;
Excess pressure.

These indications can moreover be inscribed on the corresponding sectors of the movable visual indicator.

It is likewise evident that the apparatus according to this invention can have applied thereto the devices more particularly described in the United States Patent N°. 1,412,698 of 11 April 1922, for example, amongst other devices it can have applied thereto a safety valve displaceable with the diaphragm 7 for the purpose of closing the inlet orifice for the liquid or gas when a predetermined pressure is attained. In this case a metal disc is interposed between the spindle of the valve and the diaphragm to prevent injury or deterioration of the latter.

Claims:—

1. An indicating apparatus with visual indicator, comprising: a casing,—a partition dividing this casing in two independent chambers,—a coupling putting one of these chambers in communication with the pipe line in which circulates the fluid under pressure,—a diaphragm closing this chamber and subjected to the pressure of this fluid,— a piston movable in this chamber, a shaft mounted in the second chamber and arranged at right angles to the axis of the piston,—a visual indicator rigidly mounted on this shaft,—coloured sectors on this visual indicator and a dial with apertures covering the said visual indicator,—a spring normally holding this shaft and this visual indicator in the position of rest,—a movable push-piece in the partition separating the two chambers and adapted to transmit to the shaft of the visual indicator the displacements of the piston,—a spring holding this push-piece in contact with the piston,— means for guiding the push-piece and for adjusting the tension of the spring acting on the latter, means carried by the shaft of the visual indicator for causing the amplitude of the angular displacements of the said shaft and of the visual indicator to vary for a determined stroke of the piston.

2. An indicating apparatus with visual indicator comprising: a casing,—a partition dividing this casing in two independent chambers,—a coupling putting one of these chambers in communication with the pipe line in which circulates the fluid under pressure,—a diaphragm closing this chamber and subjected to the pressure of this fluid,— a piston movable in this chamber,—a shaft mounted in the second chamber and arranged at right angles to the axis of the piston,—a visual indicator rigidly mounted on this shaft, coloured sectors on this visual indicator and a dial with apertures covering the said visual indicator,—a spring normally holding this shaft and this visual indicator in the position of rest,— a movable push-piece in the partition separating the two chambers and adapted to transmit to the shaft of the visual indicator the displacements of the piston,—a spring holding this push-piece in contact with the piston—a screw threaded sleeve adapted to guide the push-piece and to enclose the spring acting on the latter, the said sleeve adjustably screwing in the partition separating the two chambers for causing the tension of the spring to vary, means carried by the shaft of the visual indicator for causing the amplitude of the angular displacements of the said shaft and of the visual indicator to vary for a determined stroke of the piston.

3. An indicating apparatus with visual indicator, comprising: a casing,—a partition dividing this casing in two independent chambers,—a coupling putting one of these chambers in communication with the pipe line in which circulates the fluid under pressure,—a diaphragm closing this chamber and subjected to the pressure of this fluid,—a piston movable in this chamber,—a shaft mounted in the second chamber and arranged at right angles to the axis of the piston,—a visual indicator rigidly mounted on this shaft, coloured sectors on this visual indicator and a dial with apertures covering the said visual indicator,—a spring normally holding this shaft and this visual indicator in the position of rest,—a movable push-piece in the partition separating the two chambers and adapted to transmit to the shaft of the visual indicator the displacements of the piston,—a spring holding this push-piece in contact with the piston,— a screw threaded sleeve adapted to guide the push-piece and to enclose the spring acting on the latter, the said sleeve adjustably screwing in the partition separating the two chambers for causing the tension of the spring to vary,—a bent rod fitted through one of its branches in a hole diametrically passing through the shaft of the visual indicator and receiving, through its other branch, the action of the push-piece, this rod being movable in the shaft for moving the second branch towards or from the shaft and causing the leverage to vary, and this second branch can be raised or lowered by rotation in the shaft for causing the starting point of the engagement to vary.

The foregoing specification of my "visual indicator" signed by me this 8th day of January, 1926.

JULES EUGÈNE MALIVERT.